United States Patent [19]

Koning

[11] Patent Number: 4,647,243
[45] Date of Patent: Mar. 3, 1987

[54] TWINE WRAPPING MECHANISM FOR A LARGE ROUND BALER

[75] Inventor: Richard W. Koning, Ottumwa, Iowa

[73] Assignee: Deere & Company, Moline, Ill.

[21] Appl. No.: 557,708

[22] Filed: Dec. 2, 1983

Related U.S. Application Data

[62] Division of Ser. No. 382,890, May 28, 1982, Pat. No. 4,437,399.

[51] Int. Cl.⁴ .................. F16B 7/10; G05G 1/02; B30B 5/06
[52] U.S. Cl. .................................... 403/61; 403/108; 74/581; 74/586; 100/88
[58] Field of Search .................. 403/61, 108, 109, 59, 403/104, 106, 110; 74/581, 586, 526, 531, 42; 100/5, 88

[56] References Cited

U.S. PATENT DOCUMENTS

| | | | |
|---|---|---|---|
| 1,156,789 | 10/1915 | Lough | 74/586 |
| 2,686,700 | 8/1954 | McCarran | 403/104 |
| 3,383,694 | 5/1968 | Strohmeyer | 403/109 |
| 3,466,938 | 9/1969 | Wulff | 74/581 |
| 4,280,320 | 7/1981 | Eggers | 100/88 |
| 4,355,567 | 10/1982 | Josephson | 403/104 |
| 4,407,190 | 10/1983 | Cheatum | 100/88 |
| 4,438,826 | 3/1984 | Bewers | 403/109 |

Primary Examiner—Cornelius J. Husar
Assistant Examiner—Peter M. Cuomo

[57] ABSTRACT

An automatic twine-wrapping mechanism for a large round baler. The mechanism comprises (1) a twine dispensing mechanism for dispensing twine into the bale-forming chamber of the baler, (2) a reversible hydraulic drive means for cycling a twine arm of the dispensing mechanism back and forth in front of the chamber, (3) a twine wrapping control mechanism (a) for initiating a twine wrapping cycle by sensing the growth of a bale to a predetemined diameter by automatically actuating a pump drive means for driving a hydraulic pump and by positioning a hydraulic control valve to condition the hydraulic drive means to cycle the twind arm and (b) for terminating a twine wrapping cycle by deactivating the hydraulic drive means following the wrapping of twine around the bale. The twine is automatically severed by a twine cutter responsive to the movement of the twine arm following completion of the wrapping of the twine around the bale. The baler operator actuates a bale ejection mechanism following the cutting of the twine. Following bale ejection, the twine wrapping cycle is terminated by the twine wrapping control mechanism sensing that the bale chamber is empty. The baler is now ready to begin the formation of another bale therein. The wrapping control mechanism may be preset to the diameter at which it is desired to initiate the wrapping mechanism. The wrapping control mechanism also includes a manual override control linkage for initiating a twine wrapping cycle a bale diameter different from the preset diameter and for recycling the wrapping mechanism, if necessary, prior to ejection of the bale.

3 Claims, 7 Drawing Figures

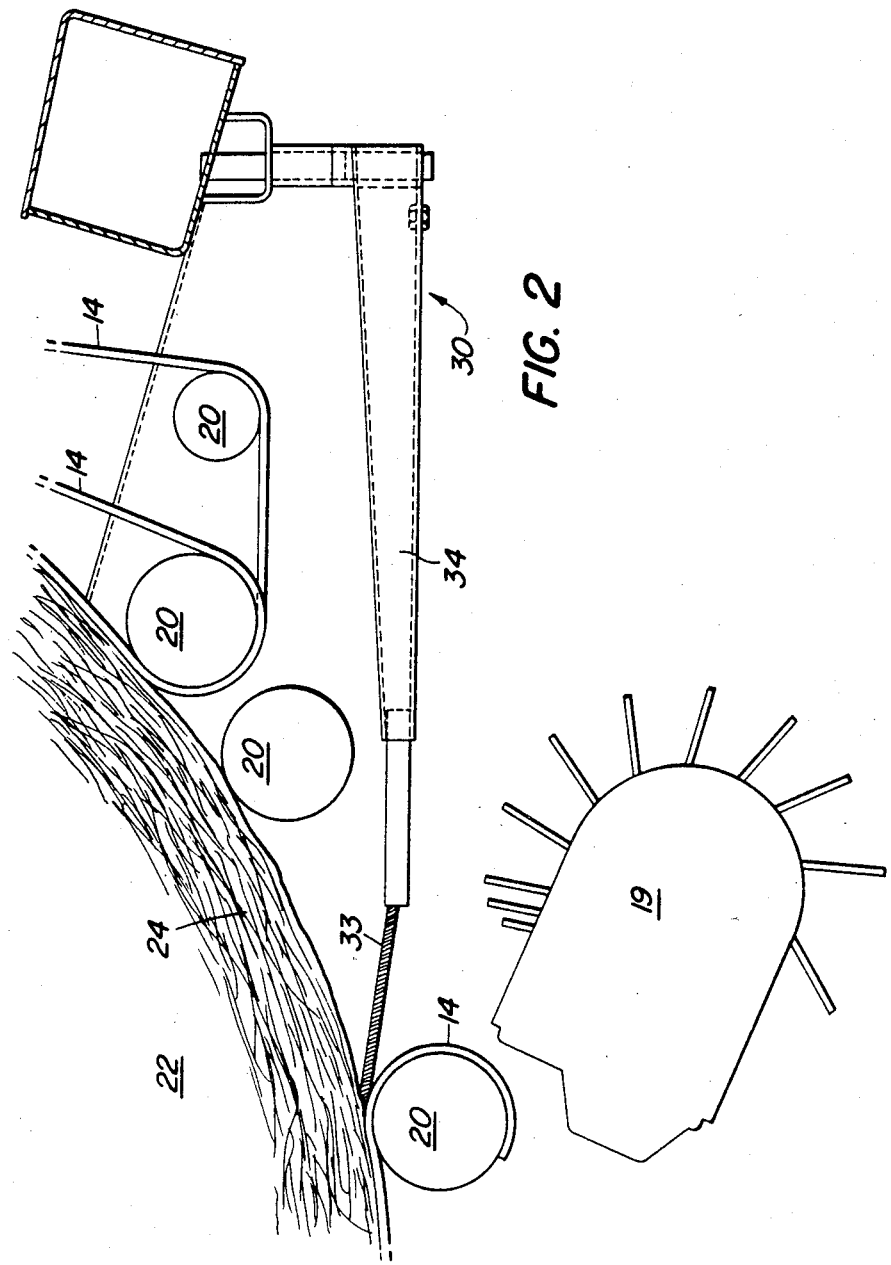

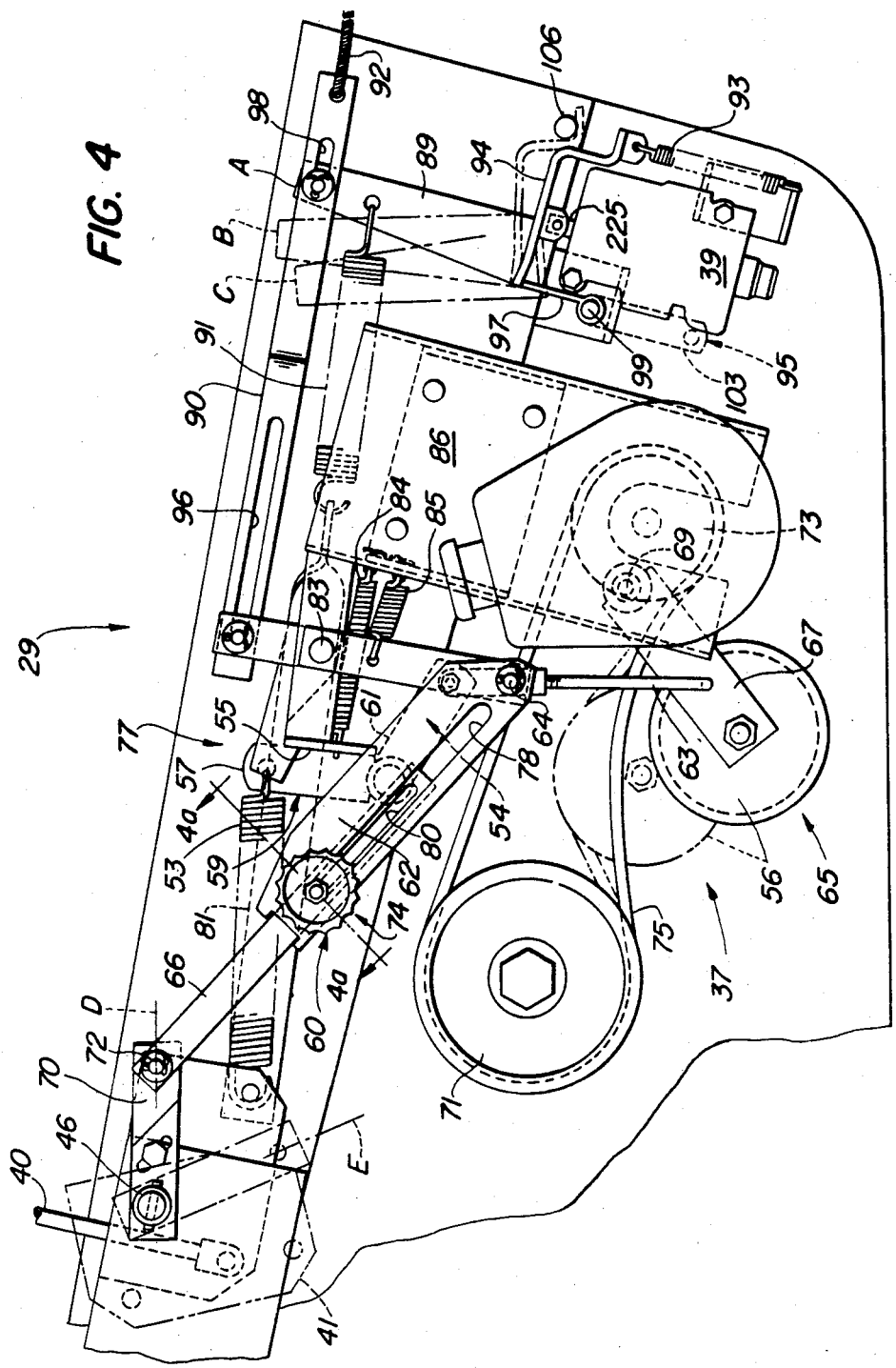

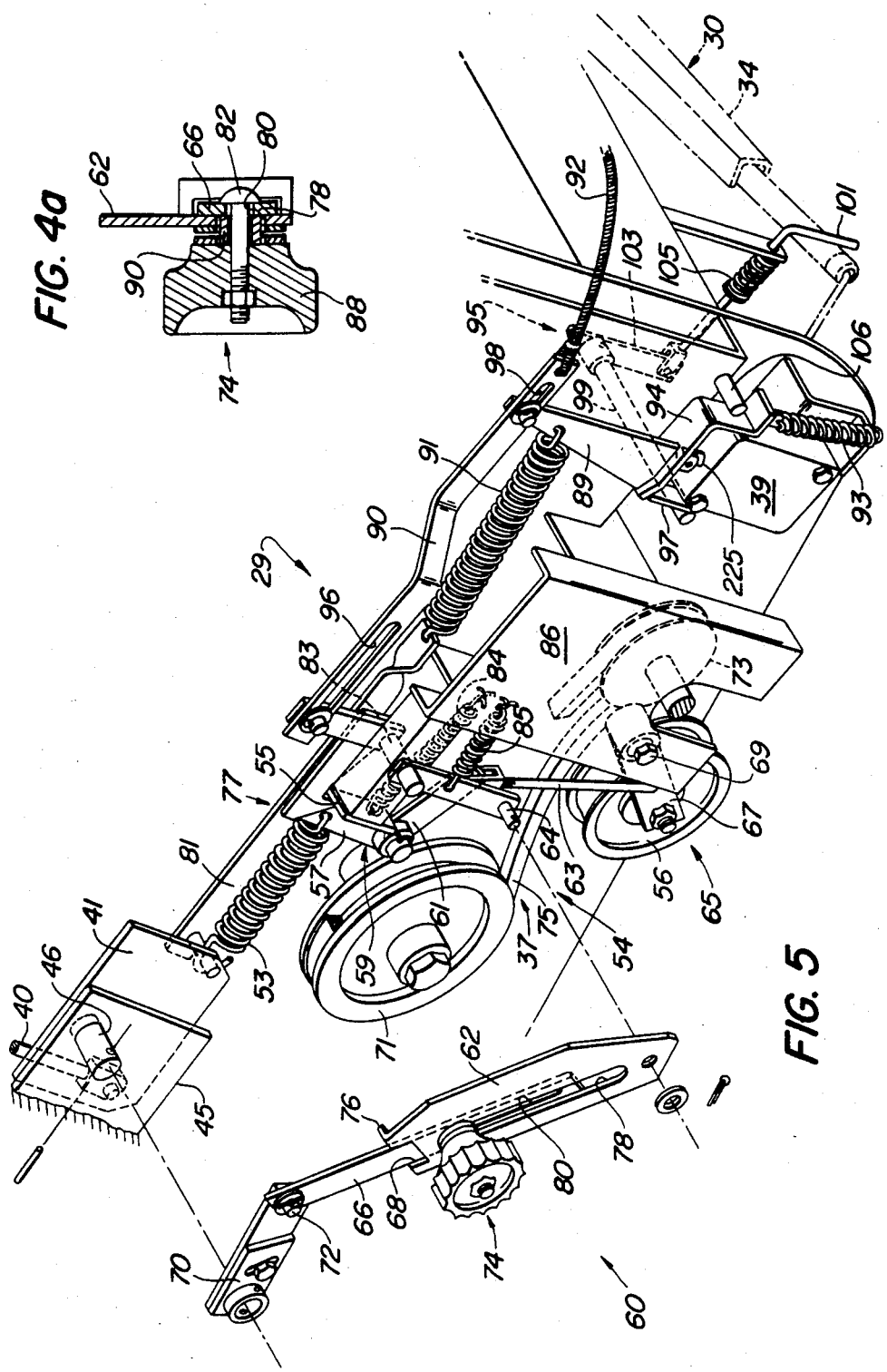

TWINE WRAPPING MECHANISM FOR A LARGE ROUND BALER

CROSS REFERENCE TO RELATED APPLICATIONS

This is a division, of application Ser. No. 382,890, filed May 28, 1982, now U.S. Pat. No. 4,437,399.

U.S. application Ser. No. 285,178 entitled STAGGERED ROLLS AND BELTS FOR ROUND BALER and filed on July 20, 1981 in the name of Jean Viaud (now, U.S. Pat. No. 4,399,746, granted Aug. 23, 1983); is directed to a round baler having a bale forming chamber defined by a plurality of belts trained about a plurality of rolls. The path of some of the belts around the rolls is varied so as to form openings through which crop material in regions adjacent the bale forming chamber may escape.

U.S. application Ser. No. 308,223, entitled BELT TENSIONING SYSTEM FOR ROUND BALERS and filed on Oct. 5, 1981 in the name of Koning et al (now U.S. Pat. No. 4,391,187, granted July 5, 1983) is directed to a round baler with a bale forming chamber defined by a plurality of belts trained about a plurality of rolls. A pair of the rolls is journalled on a carrier arm and is movable on the arm during bale formation to control the size of the bale chamber and the density of the bale being formed in the chamber.

U.S. application Ser. No. 303,274, entitled TWINE-WRAPPING MECHANISM FOR A LARGE ROUND BALER and filed on Sept. 17, 1981 in the name of Meiers (now U.S. Pat. No. 4,457,226, granted July 3, 1984) is directed to a cylindrical baler with an automatic mechanism for wrapping twine around bales formed in the chamber at the end of the bale formation cycle.

BACKGROUND OF THE INVENTION

This invention is directed to a baler (commonly known as "round baler") for forming cylindrical bales and having a bale forming chamber defined by a plurality of belts trained about a plurality of rolls and more particularly, to an automatic mechanism with a manual override for wrapping twine around bales formed in the chamber.

Semiautomatic twine wrapping mechanisms for round balers for agricultural crops are well know. One commercially available wrapping mechanism is similar to that disclosed in U.S. Pat. Nos. 3,894,484 and 3,913,473. The mechanism comprises generally a hydraulically driven twine arm whhich is movable back and forth in front of an entrance to the bale forming chamber. Initiation and termination of the twine wrapping cycle is manually controlled. The rate of advance of the arm transversely of the bale forming chamber is subject to manual control by the adjustment of the flow control valve in the hydraulic circuit. Following extended commercial use, certain disadvantages for this mechanism have been noted. First, it is desirable to provide automatic (rather than semiautomatic) initiation and termination of the twine wrapping cycle. Heretofore, the operator monitored a bale size gauge on the front of the baler from the operator's position on the tractor pulling the baler. When the bale reached the desired size, the operator then continued baling and pulled a hydraulic lever to actuate movement of the twine arm from a first side of the baler to the second. Twine was fed with the crop material into the bale forming chamber, and then tractor was stopped to discontinue feeding crop into the chamber. The hydraulic lever was retained in its shifted position until the twine arm reached the second side and held there to allow one or more turns of twine to go around the end of the bale. Then, the hydraulic lever was shifted back to its original position to actuate movement of the twine arm back to the first side of the baler. The rate of movement of the twine arm from the second to the first side of the baler and therefore the number of wraps of twine around the bale was controlled adjustment of the flow control valve in the hydraulic circuit. The rate of flow was adjusted such that at least one full wrap of twine was formed around the end of the bale. The twine is then automatically cut. With the automation of such procedure, the burden on the operator of monitoring the operation of the machine behind him from his position in front of the tractor would, of course, be relieved.

It is also known to provide a fully automated twine wrapping mechanism using a mechanical drive from the PTO to drive a pair of twine arms transversely of the bale forming chamber. See, for example, U.S. Pat. No. 4,167,844.

Further, it is known to provide a fully automated twine wrapping system using a spring drive for moving a single twine arm from a first side to the second side of the baler and a hydraulic drive for moving the twine arm from the second side back to the first side. See U.S. Pat. No. 4,150,614.

In accordance with U.S. application, Ser. No. 303,274, cross referenced above, a fully automated hydraulically driven twine wrapping mechanism is disclosed. The wrapping mechanism includes a twine wrapping control mechanism which automatically controls the actuation of a hydraulic pump and a control valve of a hydraulic drive means for the twine dispensing mechanism. The control mechanism further includes a bale diameter sensing including lost motion link which is adjustable to preset the diameter at which the wrapping mechanism would be actuated.

Actuation is accomplished by stretching a pair of springs to energize the hydraulic drive means when the springs are fully stretched. The full stretch of the springs causes the release of a latch to relieve the tension on one of the springs to actuate the drive for the hydraulic pump. However, the sensing link has a limited range of adjustability. In addition, no means is provided for manually overriding the fully automated twine wrapping control mechanism and thus, the operator does not have the flexibility to actuate the wrapping mechanism at his option such as may be desirable, for example, on the completion of baling in a field.

It is known to provide a round baler with a twine wrapping mechanism which is adapted to be actuated either manually or automatically by a power motor such as a hydraulic cylinder. See U.S. Pat. No. 4,072,095.

Accordingly, it is an object of this invention to provide an improved fully automated hydraulically driven twine wrapping mechanism including a twine wrapping control mechanism, with a manual override for permitting an operator to wrap a bale at a selected diameter irrespective of the diameter preset for automatic actuation of the twine wrapping mechanism.

Another object of the invention is to provide a twine wrapping mechanism with a single manual override control linkage for cycling the twine dispensing mechanism through a second cycle and for actuating the wrapping mechanism to wrap a bale at a selected diameter irrespective of the diameter preset for automatic actuation of the twine wrapping mechanism.

Still another object is to provide a lost motion link for controlling actuation of a latch for the pump drive independently of tension springs for shifting a hydraulic drive means and a hydraulic valve control arm.

SUMMARY OF THE INVENTION

These and other objects of the invention are accomplished by an automatic twine wrapping mechanism for a cylindrical baler comprising a twine dispensing mechanism for dispensing twine into the bale forming chamber for wrapping around a bale being formed therein. The dispensing mechanism includes a twine arm movable back and forth in front of the bale forming chamber between first and second positions. The twine arm is driven back and forth in front of the bale forming chamber by a hydraulic drive means. The drive means includes (1) a cylinder, (2) a hydraulic pump connected to the cylinder, (3) a pump drive for selectively driving the pump, and (4) a control valve interconnected between the cylinder and the pump. The valve conditions the hydraulic drive means such that the twine arm is driven from the first position to the second position and from the second position back to the first position. A control means initiates a twine wrapping cycle by automatically actuating the pump drive means and positioning a valve control arm in a first position for moving the twine arm from its first to its second position responsive to the formation of a completed bale in the chamber and terminates a twine wrapping cycle by deactivating the hydraulic drive means following completion of the wrapping of twine around the bale.

The control means includes (1) a drive control linkage for engaging and disengaging the pump drive, (2) means for biasing the drive control linkage into an engaged position, (3) a latch for locking a drive control linkage in a disengaged position and (4) a bale size linkage movable responsive to a change in the diameter of a bale being formed in the bale forming chamber.

In accordance with the improvement of this invention, the control means further includes a latch control linkage connected between the bale size linkage and the latch. The latch control linkage has a plurality of settings for determining the bale diameter at which the latch is unlocked. The control means further includes a manual control linkage remotely actuatable from an operator's station for the baler for the dual purposes of (1) actuating the wrapping mechanism at a selected diameter different from that preset on the latch control linkage or (2) actuating the wrapping mechanism for a second cycle. The manual control linkage is connected between the latch and a valve control arm and is operable for unlocking the latch and positioning the in the first valve control arm position.

In accordance with the preferred embodiment, the bale size linkage includes a bell crank and the latch control linkage includes a lost motion linkage defined by a strap and a flat plate with a tab at one end. The strap is inserted through an opening provided in the tab and is disposed alongside the plate. Both the strap and plate are provided with linear longitudinal slots aligned with each other and the opening in the tab. A connecting member is inserted through the slots of the angle and strap, and is adjustable to various positions along the slot in the strap for establishing a plurality of different lost motion settings corresponding to a plurality of diameters at which a bale is to be automatically wrapped.

BRIEF DESCRIPTION OF THE DRAWINGS

FIG. 2 is a side cross-sectional view of the bale chamber crop inlet of the baler of FIG. 1. The twine arm of the twine dispensing mechanism is shown dispensing twine into the bale chamber.

FIG. 4 is a side elevational view of another portion of the twine wrapping control mechanism for the automatic twine wrapping mechanism of FIG. 1.

FIG. 4A is a cross-sectional view of a portion of the twine wrapping control mechanism taken allong line 4A—4A of FIG. 4.

FIG. 5 is a perspective, partially exploded view of the same portion of the twine wrapping control mechanism shown in FIG. 4. For clarity the hydraulic pump 38 shown in FIG. 4 is omitted in FIG. 5.

DESCRIPTION OF THE PREFERRED EMBODIMENT

I.

General

Figure 1:
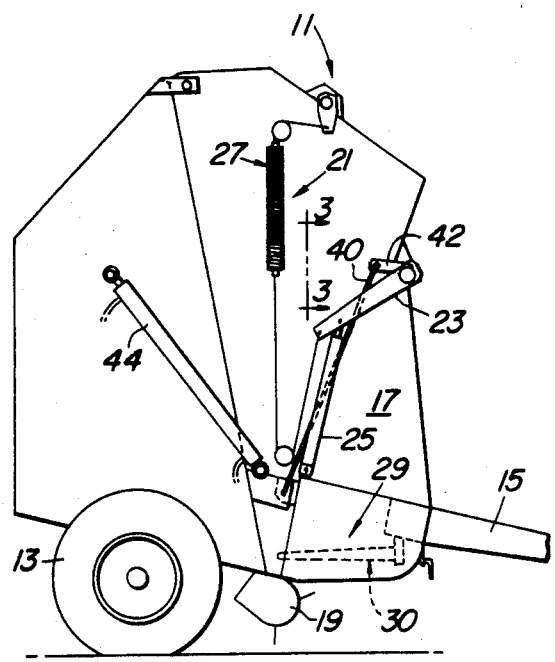
FIG. 1 is a right side, elevational view of a large round baler with an automatic twine-wrapping mechanism in accordance with a preferred embodiment of this invention.

Reference is now made to FIGS. 1 and 2 which shows a large round baler 11 with an automatic twine wrapping mechanism 12 in accordance with a preferred embodiment of this invention. FIG. 1 is a simplified side elevational view of baler 11 for forming large cylindrical bales of hay or other crop material. FIG. 2 is a fragmentary cross-sectional, schematic view of the front of baler 11. Baler 11 includes a pair of wheels 13 (only one shown) for supporting the baler 11 for being pulled via a tractor (not shown) through attachment to tongue 15. The baler is powered through attachment to a conventional rear power take-off mechanism of the tractor. Baler 11 further includes a pair of upright opposite fore-and-aft extending sidewalls 17, and a plurality of belts 14 supported on a plurality of transverse rolls 20 (some of which are shown in FIG. 2). The roll and belt arrangement shown in FIG. 2 is disclosed and claimed in U.S. application Ser. No. 285,178 cross-referenced above, and the disclosure of which is hereby incorporated by reference. Such arrangement forms no part of the invention herein and is shown and described in part herein only to illustrate the general environment in which the twine wrapping mechanism of this invention is preferably utilized. A crop pickup mechanism 19 of a conventional construction is mounted beneath sidewalls 17, for feeding crop material into bale forming chamber 22. When material is fed into the bale forming chamber 22, it expands under the control of a tensioning mechanism whereby the density of the bale being formed therein is controlled. The tensioning mechanism 21 is described in more detail and claimed in application Ser. No. 308,223, cross-referenced above, the disclosure of which is hereby incorporated by reference. Tensioning mechanism 21 forms no part of the invention herein and thus is only briefly described herein. Tensioning mechanism 21 includes a pair of control arms 23 (only one being shown) mounted respectively on the exterior of sidewalls 17 to which tension is applied by a pair of hydraulic cylinders 25 (only one shown) and a pair of spring mechanisms 27 (only one shown). As a bale 24 being formed increases in diameter, arm 23 is rotated clockwise in FIG. 1 against the tension imposed thereon by cylinder 25 and spring mechanism 27. When the bale 24 being formed in the chamber is completed (i.e. reaches a predetermined diameter), the twine wrapping mechanism 12 is actuated, in a manner set forth hereinbelow, to apply twine to the circumference of bale 24.

Figure 3:
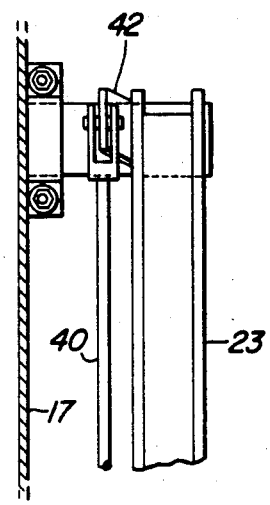
FIG. 3 is a cross-sectional view taken along lines 3—3 of FIG. 1 and showing a portion of the twine wrapping control mechanism.
Figure 6:
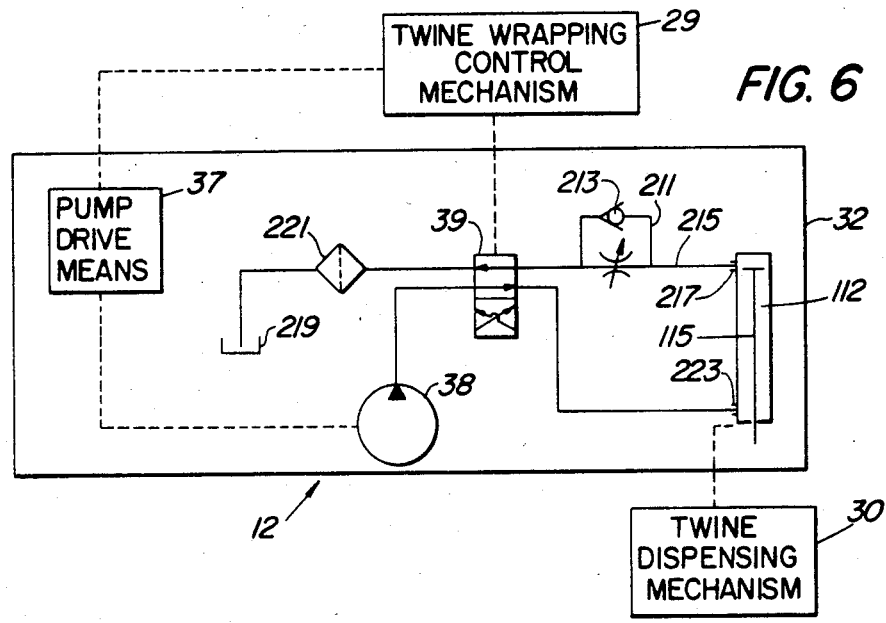
FIG. 6 is a general schematic of the twine wrapping mechanism including a detailed schematic circuit diagram of the hydraulic drive means.

As schematically illustrated generally in FIG. 6, wrapping mechanism 12 includes (1) a twine dispensing mechanism 30 (FIG. 2) for dispensing twine 33 into chamber 22, (2) a hydraulic drive means 32 (FIG. 6) for cycling a twine arm 34 (FIG. 2) of twine dispensing mechanism 30 back and forth in front of chamber 22 and (3) a twine wrapping control mechanism 29 (FIGS. 3-5) for initiating a twine wrapping cycle (a) by sensing the growth of bale 24 to a predetermined diameter (b) by automatically actuating a pump drive means 37 driving a hydraulic pump 38 (shown in FIG. 4 and omitted in FIG. 5 for clarity) and (c) by positioning a two-position hydraulic control valve 39 in a first position and for terminating a twine wrapping cycle by deactivating hydraulic drive means 32 following the wrapping of twine 33 around bale 24. Following completion of the wrapping of a bale in the bale forming chamber 22 by the dispensing of twine 33 from twine-dispensing mechanism 30, twine 33 is severed automatically by a twine cutter not shown herein and preferably as shown in FIGS. 12, 13 of application Ser. No. 303,274 cross-referenced above. Following the cutting of the twine 33, the baler operator actuates a bale ejection mechanism (not shown) which actuates a hydraulic cylinder 44 (FIG. 1) for opening bale forming chamber 22 and permitting the bale to roll out onto the ground. Following bale ejection, baler 11 is then ready to begin the formation of another bale therein.

II.

Twine Wrapping Control Mechanism

Referring now primarily to FIGS. 1, 3-5, wrapping control mechanism 29 includes a bale diameter sensing linkage including a link 40 interconnected between tension control arm 23 and a bell crank 41. Link 40 is pivotably mounted to tension control arm 23 via a bracket 42 fixed to arm 23 and is pivotably mounted to one end of bell crank 41. Bell crank 41 is joined to a pivot shaft 46 rotatably received in a fixed support 45 for pivoting clockwise from position D, corresponding to when the bale chamber is empty or contains a bale too small to effect movement of the control arm 23. Once the bale being formed in the chamber 22 grows to a size large enough to overcome the tension applied by the cylinders 25 and the spring mechanism 27, further bale growth moves the arms clockwise resulting in the link 40 being moved to the upper right in FIG. 1 and the bell crank 41 being rotated clockwise from position D.

Position E is representative of one of a plurality of positions to which bell crank 41 may be moved from position D for initiation of a wrapping cycle. The exact location of a given position E is proportional to the diameter of the bale at which the wrapping cycle is initiated, which diameter may be preselected in a manner set forth hereinbelow.

Movement of bell crank 41 to position E shown in FIG. 4 initiates the driving of pump 38 of the hydraulic drive means 32 by actuation of pump drive means 37. Bell crank 41 is connected to one end of an idler tension spring 53. A second end of idler tension spring 53 is connected to a pump drive idler 65 of pump drive 37 via drive control linkage which is preferably embodied by an idler linkage 54 movable between idler engaged and disengaged positions. Linkage 54 is constituted by (1) an idler bell crank 59, (FIG. 5) having first and second arms 57 and 61, respectively (2) a flange 55 and the second end of spring 53 attached to the first arm 57 and (3) a link 63 connecting the second arm 61 to the pump drive idler 65. Pump drive idler 65 includes an idler pulley 56 which is rotatably mounted on an arm 67 pivotally mounted at 69.

Pump drive 37 further includes a drive pulley 71 interconnected to the "power take-off" shaft (not shown) of the tractor and a driven pulley 73 interconnected with the drive pulley 53 through a belt 75.

The engagement of the pump drive 37 is precisely controlled to be initiated only after the bale 24 has reached a predetermined diameter. An idler latch 77 is provided for locking idler 54 in its idler disengaged position until a bale in the chamber has reached a predetermined diameter.

In accordance with the improvement of the invention, latch 77 is actuated by a lost motion latch control linkage 60 connecting the bell crank 41 and latch 77. Latch control linkage 60 has a plurality of settings for varying the lost motion thereof for determining the bale diameter, in excess of a minimum value, required to effect movement of the tension control arms 23 at which latch 77 is unlocked to initiate a bale wrapping cycle. Latch control linkage 60 includes a plate 62 pivoted to latch 77 at a pivot 64, (2) a strap 66 inserted and longitudinally adjustable through a guide means in the form of an opening 68 provided in a tab 76 at one end of the plate 62 responsive to pivotal movement of crank 41 and (3) a lever 70 pinned to the pivot shaft 46 at one end and pivotally connected to strap 66 at pivot 72. A connecting means 74 slidably connects plate 62 and strap 66 through slots 78, 80 formed respectively therein and permits the maximum lost motion permitted between the strap 66 and plate 62 to be adjusted to correspond to a desired bale diameter at which latch 77 is to become unlocked. As shown in FIG. 4A, connecting means 74 includes a bolt 82 inserted through slots 78, 80, a knob 88 into which bolt 82 is fixed and a sleeve 90 which, when the knob 88 is tightened, clamps strap 66 against the head of bolt 82. When strap 66 is so clamped to connecting means 74, plate 62 remains slidable relative to strap 66 within the limits of lost motion permitted by the position of connecting means 74 in slot 80. When the connecting means is positioned in the left end of the slot 80 as shown in FIG. 4, the sleeve 90 is located in the left end of the slot 78 when the crank arm 41 is in its position D. Therefore, the lost motion permitted between the plate 62 and strap 66 is a minimum whereby the degree of rotation of crank 41 which is needed to unlock latch 77 is a minimum. Conversely, adjusting the connecting means 74 to the right end of slot 80 will result in, the maximum degree of rotation of crank 41 being required to unlock latch 77. A small amount of rotation of crank 41 corresponds to a small bale diameter and a larger amount of crank rotation corresponds to a larger bale diameter.

Latch 77 is pivotally mounted at 83 and is biased into its latched position via a return spring 85. When crank 41 is rotated clockwise to position E responsive to formation of a bale in the bale chamber of a predetermined diameter, spring 53 is tensioned and at the same time strap 66 of latch control linkage 60 is moved toward the rear (to the left in FIG. 4) of the baler. With the rearward movement of strap 66, sleeve 90 finally engages the end of slot 78, causing latch 77 to pivot clockwise about pivot 83 thereby releasing bell crank 59 to be pivoted counterclockwise by the contraction of spring 53. With the pivoting of crank 59 counterclockwise, idler 65 is moved to engage and tension belt 75 providing driving engagement between pulleys 71, 73.

At the end of the twine wrapping cycle, an idler return spring 84 connected between a frame member 86 and flange 55 biases idler linkage 54 to its idler disengaged position in the absence of an overriding bias from spring 53. Linkage 54 is then locked in this position by latch 77.

Control mechanism 29 (FIG. 4) is further operative to control the actuation of two-position hydraulic control spool valve 39 by shifting valve control arm 89 among three valve control positions, namely, position A, a rest position in which arm 89 is disposed between twine wrapping cycles, position B for movement of the twine arm 34 from the left side to the right side and position C for movement of the twine arm 34 from the right side back to the left side. When control arm 89 is in position A or C, valve 39 is in the position shown in FIG. 6. When control arm 89 is in position B, valve 39 is in its second position not illustrated in FIG. 6, but formed by connecting the lower envelope of the valve 39 into the hydraulic circuit of FIG. 6. Referring again to FIG. 5, control mechanism 29 further includes a valve control arm spring 91 connected to bell crank 41 via link 81 and to valve control arm 89 for biasing control arm 89 into positions B and C responsive to the formation of a completed bale in chamber 22. A control arm return spring 93 is attached to control arm 89 for biasing control arm into position A at the end of a wrapping cycle when the bias of spring 91 is relieved. When a bale of a predetermined diameter is formed in the bale forming chamber and crank 41 is rotated clockwise, sufficient tension is imposed by spring 91 on arm 89 to overcome the resistance of spring 93 and to move arm 89 from position A to position B. When so positioned, the hydraulic drive means 32 shifts twine arm 34 from the left side to the right side. Control arm 89 is prevented from moving from position B to C by a control arm latch 95. Latch 95 comprises a latch member 99 with a finger 97 at one end engageable with the lower surface of control arm 89 and a latch actuation arm 101 which is interconnected with latch member 99 via a link 103. When control arm 89 is shifted from position A to B a pin 225, pivoted at one end to a lower plate 94 of control arm 89 and connected at the other to the spool of valve 39, is pulled outwardly so that one end of plate 94 engages the top finger 97 and the other engages the bottom of a stop 106. Latch member 97 is rotatably mounted in sidewall 17 and is rotatable counterclockwise against the bias of a spring 105 responsive to the engagement of actuation arm 101 with twine arm 34 at the end of its travel from the left side to the right side of the baler. Upon rotation of latch member 99 counterclockwise, spring 91 shifts control arm 89 into position C which results in the twine arm 34 being driven from the right side to the left side of the baler. In moving from position B to C, plate 94 is shifted counterclockwise and downwardly to shift pin 225 inwardly.

In accordance with another feature of this invention, a manual control linkage 90 is remotely actuable from an operator's station for the baler via rope 92 and is connected between latch 77 for unlocking latch 77 and valve control arm 89 for restoring (if necessary) valve control arm initially to position A and then to position B. Linkage 90 serves two purposes. First it permits the operator to actuate the wrapping mechanism at his discretion such as for example when completing the baling operation in a field and insufficient crop is available to complete the bale being formed. In this instance, the operator may actuate wrapping mechanism 12 without regard to the setting fixed on latch control linkage 60 assuming the bale in the chamber is of sufficient diameter to have rotated the crank arm 41 to tension springs 53, 91 such that pump drive 37 is actuated and valve control arm is biased to position B from position A. Secondly, linkage 90 permits the operator to initiate a second cycle of the wrapping control mechanism 29 to provide additional wraps of twine on a completed bale. Linkage 90 is attached to latch 77 and control arm 89 via pivotably and slidable connections in slots 96, 98 respectively of linkage 90. Slots 96, 98 permit free movement of latch 77 and control arm 89 to and from their various positions during the automatic operation of wrapping control mechanism 29.

In operation, as crop material is fed into bale forming chamber 22, a bale 24 grows in diameter. The expansion of chamber 22 is controlled by tension control arms 23 which are pivoted clockwise in FIG. 1. Sensing link 40 is moved upwardly with one of the control arms 23. With movement of sensing link 40, bell crank 41 (FIGS. 4, 5) is pivoted clockwise from position D toward position E which stretches idler tension spring 53 and valve control arm spring 91. Position E, the position at which a wrap cycle is initiated, is determined by the setting of connecting means 74 in slot 80 of strap 66 which controls the lost motion the linkage will undergo before the engagement of sleeve 90 with the left end of slot 78 of plate 62 (FIG. 4). After the crank 41 reaches position E, further rotation thereof acts through linkage 60 to cause the latch 77 to swing about pivot 83 and becomes released. Then the tension in spring 53 is applied to move idler linkage 54 from its disengaged to its idler engaged position against the bias of idler return spring 84. Pump drive belt 75 is thus tensioned to drive pump 38 thereby activating hydraulic drive means 32 for twine dispensing mechanism 30.

As valve control spring 91 is tensioned by the movement of bell crank 41 from position D toward position E, sufficient force is applied to the control arm 89 to overcome the force applied to control arm 89 by return spring 93 resulting in the shifting of control arm 89 from position A to position B (FIG. 4). Control arm 89 assumes position B prior to the releasing of latch 77 to engage pump drive 53. In moving from position A to position B, control arm 89 moves counterclockwise and upwardly and acts through pin 225 to pull the spool of valve 39 upwardly to set the hydraulic drive means 32 to shift twine arm 34 from the left side adjacent the left sidewall to the right side adjacent sidewall 17. When twine arm 34 reaches the right side and engages actuator arm 101 (FIG. 5) to release latch 95, control arm 89 (FIG. 4) is shifted from position B to C under the bias of spring 91. This movement results in the arm portion 94 engaging stop 106 and in the shifting of pin 225 and hence the spool of valve 39 inwardly to reverse hydraulic drive means 32. When reversed, twine arm 34 is driven from right side to the left side. Upon reaching the end of travel, twine arm 34 engages a cutter mechanism (not shown) which is activated to sever twine 33. The baler operator then activates a conventional mechanism (not shown except for cylinder 44) to eject bale 24 from chamber 22. Following ejection, tension control arm 23 rotates counterclockwise and shifts sensing link 40 downwardly. As sensing link 40 shifts downwardly, bell crank 41 pivots from position E toward position D this permitting idler return spring 84 to restore idler linkage 54 to its idler disengaged position deactivating pump drive 37 and permitting bell crank 59 to be locked into this position by latch 77.

As bell crank 41 is moved from position E to D, the tension on spring 91 is reduced and reaches a level such that return spring 93 shifts control arm 89 from position C to A. During this movement, the position of the spool of valve 39 is unchanged. With the deactivation of pump drive 37 and the restoring of control arm 89 from position C to A, the bale wrapping cycle is thus ended and is conditioned for initiation of a subsequent twine wrapping cycle when the formation of another bale is complete.

Through manual control linkage 90, an operator at his discretion can release latch 77 to activate pump drive 37 (assuming spring 53 is sufficiently tensioned to shift idler linkage 54 into an idler engaged position) and to permit valve control arm 89 to be moved from position C to position A so that a second wrapping cycle may be initiated for the same bale. The geometry of bell crank 41, latch control linkage 60 and springs 53, 91 is chosen such that: (1) substantially all of the tension is applied to springs 53, 91 during growth of a bale diameter from, for example, 0 to 3 feet (0.91 meter) in diameter for a baler capable of forming a bale with a maximum bale diameter of 6 feet (1.82 meters), (2) limited extension of springs 53, 91 takes place during the growth of a bale from 3 to 6 feet in diameter, (3) limited rearward movement of linkage 60 takes place during the bale growth from 0 to 3 feet in diameter, (4) substantial rearward movement of linkage 60 takes place during the growth of a bale from 3 to 6 feet in diameter. With this geometry and for this example, the minimum "predetermined" diameter at which the wrapping mechanism may be automatically or manually actuated is 3 feet. At bales sizes of less than 3 feet, there is insufficient tension on spring 53 to shift idler linkage 54 to its idler engaged position.

III.

Hydraulic Drive Means

Reference is now made to FIG. 6, which illustrates a general schematic of twine wrapping mechanism 12 including a detailed schematic circuit diagram of the reversible hydraulic drive means 32 for cycling the twine arm 34 back and forth in front of the bale forming chamber 22. The drive means 32 includes the double acting hydraulic cylinder 112, hydraulic pump 38 connected to cylinder 112 through the four way, two position spool valve 39. An adjustable flow control valve 211 with a bypass 213 is provided in line 215 interconnecting one port of valve 39 with a base port 217 of hydraulic cylinder 112. By the action of flow control valve 211, fluid flow to the left is controlled (i.e. adjustable) and fluid flow to the right flows through bypass 213 and is uncontrolled (i.e. not adjustable). Thus fluid flow to extend the piston 115 of the hydraulic cylinder 112 is uncontrolled while fluid flow to retract the piston of the hydraulic cylinder is controlled. A fluid reservoir 219 is also connected to valve 39 through a filter strainer 221.

In operation, FIG. 6 illustrates the condition of the hydraulic drive means between bale wrapping cycles, that is, when the bale chamber is empty or during the formation of a bale in the bale forming chamber. Between bale wrapping cycles, valve control arm 89 is in position A (FIG. 4). In this position, pump 38 is not driven by pump drive 37, thus, no fluid is flowing into a forward port 223 of the cylinder from pump 38. When a completed bale is formed, control means 29 initially shifts valve control arm 89 from position A to B and thereafter activates pump drive means 37. When valve control arm 89 is shifted from position A to position B, the spool of the valve is shifted outwardly of valve 39 completing the fluid path between pump 38 and base port 217 through the bypass 213 of flow control valve 211. Following activation of pump drive 38, the plunger 115 of the cylinder 112 is extended and fluid flows from forward port 223 through valve 39, filter strainer 221 and into reservoir 219. When control arm 89 is shifted from position B to position C, the spool of valve 39 is moved inwardly to complete the fluid path between pump 38 and forward port 223 to cause the plunger 115 of the cylinder 112 to retract. During retraction, fluid from base port 217 flows through adjustable flow control valve 211, which controls the rate of flow therethrough. From valve 211 fluid passes through valve 39, filter strainer 221 and thereafter into reservoir 219. Twine 33 is severed by a twine cutter (not shown) when plunger 115 is fully retracted. The wrapping of the bale is now complete and the bale is ejected by the operator. Following ejection, wrapping control mechanism 29 deactivates pump drive means 37 and shifts valve control arm 89 from position C to A. When control arm 89 is shifted from position C back to A, the position of the spool of valve 87 is unchanged. Hydraulic drive means 32 is thus deactivated until the initiation of another bale wrapping cycle.

The invention herein has been described in connection with a preferred embodiment thereof. It will be appreciated by those skilled in the art that other embodiments and modifications thereof are possible. Accordingly, it is intended that the appended claims cover all such embodiments and modifications as are within the true spirit and scope of the invention.

I claim:

1. An adjustable lost motion linkage, comprising:
a first member having an elongate, linear adjustment slot formed therein; a second member having an elongate, linear lost motion slot formed therein; a connecting means received in said adjustment slot, being releasably fixed to said first member at a desired location along said adjustment slot and being received in said lost motion slot for movement therealong; and said second member including a guide means cooperating with said connecting means for constraining the first member to linear motion relative to the second member with the adjustment and lost motion slots moving in parallel overlapping paths.

2. The linkage defined in claim 1 wherein said guide means comprises an opening formed in said second member in alignment with the length of the lost motion slot and said first member being slidably received in said opening.

3. The linkage defined in claim 2 wherein said lost motion slot is greater in width than said adjustment slot; said connecting means comprising a bolt projecting through the lost motion and adjustment slots and having a head end engaging a first side of the first member; a sleeve received on the bolt, disposed within the lost motion slot and having an end engaged with a second side of the first member opposite from the first side; and a knob incorporating a nut threaded onto said bolt and being engaged with a second end of the sleeve, whereby tightening of the knob sandwiches the first member between the sleeve and the head end of the bolt.

* * * * *